United States Patent [19]

Holtermann

[11] 4,122,652
[45] Oct. 31, 1978

[54] LAWN MOWER BLADE CLUTCH AND BRAKE

[75] Inventor: Theodore J. Holtermann, Milwaukee, Wis.

[73] Assignee: Outboard Marine Corporation, Waukegan, Ill.

[21] Appl. No.: 706,122

[22] Filed: Jul. 16, 1976

[51] Int. Cl.² ............................................. A01D 69/08
[52] U.S. Cl. ....................................... 56/11.3; 56/11.8; 192/18 R
[58] Field of Search ...................... 56/11.3, 11.7, 11.8; 192/18 R, 14

[56] References Cited

U.S. PATENT DOCUMENTS

| | | | |
|---|---|---|---|
| 2,930,460 | 3/1960 | Isaacson | 192/18 R |
| 2,985,992 | 5/1961 | Dowdle | 56/11.3 |
| 2,993,329 | 7/1961 | Schmidt | 56/11.8 |
| 3,445,991 | 5/1969 | Hanson et al. | 56/11.8 |
| 3,691,859 | 9/1972 | Peters | 192/18 R |
| 3,871,159 | 3/1975 | Shriver | 56/11.3 |
| 3,998,034 | 12/1976 | Rubin | 56/11.3 |

Primary Examiner—Jay N. Eskovitz
Attorney, Agent, or Firm—Michael, Best & Friedrich

[57] ABSTRACT

Disclosed herein is a combined brake and clutch comprising a drive member, a driven member mounted for coaxial rotation relative to the drive member, interengageable friction disks extending from each of the drive members and the driven member, a spring biasing the driven member to drivingly engage the friction disks, and a brake member engageable with the driven member for displacing the driven member against the action of the spring to permit disengagement of the friction disks and for braking rotation of the driven member.

22 Claims, 5 Drawing Figures

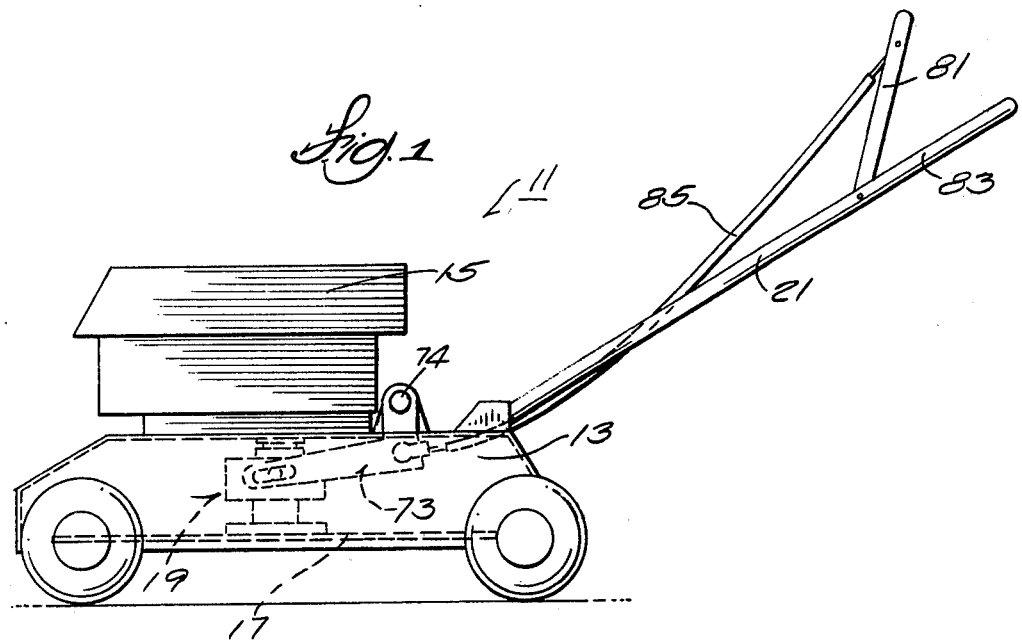
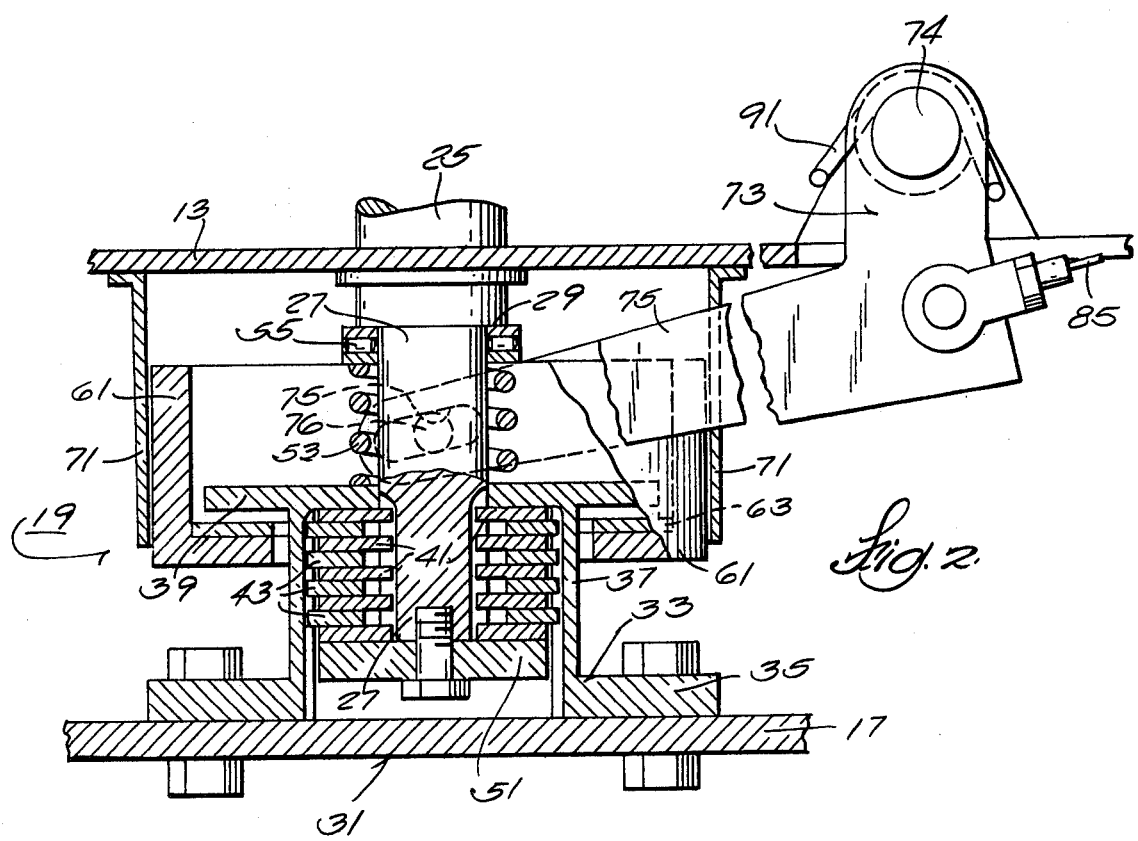

LAWN MOWER BLADE CLUTCH AND BRAKE

BACKGROUND OF THE INVENTION

The invention relates generally to rotary lawn mowers and more particularly to rotary lawn mowers including a clutch operable to engage and disengage a cutter blade with respect to a prime mover. Still more particularly, the invention relates to rotary lawn mowers in which cutter blade rotation is simultaneously braked incident to disengagement of the clutch.

Particular attention is directed to the U.S. Dowdle Pat. No. 2,985,992 issued May 30, 1961 and to the U.S. Shriver Pat. No. 3,871,159 issued Mar. 18, 1975.

Attention is also directed to the following additional prior U.S. Pat Nos.: Cavaness 2,471,367 issued May 24, 1949, Kuhary 2,685,160 issued Aug. 3, 1954, Schmidt 2,993,329 issued July 25, 1961, Sanderson 3,050,923 issued Aug. 28, 1962, Nemeth 3,247,654 issued Apr. 26, 1966, Ottosen 3,298,163 issued Jan. 17, 1967.

The invention also relates to clutch mechanisms of the type including interleaved disks or friction members.

SUMMARY OF THE INVENTION

The invention provides a rotary lawn mower comprising a drive shaft supported for rotation by a blade housing carried for travel over the ground, a blade assembly mounted for co-axial rotation relative to the drive shaft and including a cutter blade mounted for cutting operation within the blade housing, interengagable clutch means extending from each of the drive shaft and the blade assembly, means biasing the blade assembly to engage the clutch means, and means non-rotatably mounted on the blade housing and engagable with the blade assembly for displacing the blade assembly against the action of the biasing means to disengage the clutch means and for braking rotation of the blade assembly.

In one embodiment in accordance with the invention, the means for displacing the blade assembly and for braking rotation of the blade assembly comprises a brake member movable axially of the drive shaft between a first position engaging the blade assembly so as to disengage said clutch means and so as to brake blade assembly rotation and a second position spaced from the blade assembly.

In one embodiment of the invention, the lawn mower further includes a handle for steering movement of the lawn mower, an operating lever mounted on the handle for movement between a first position spaced from the handle and a second position adjacent to the handle, a linkage connecting the operating lever with the brake member to locate the brake member in the first position when the lever is in the first position and to locate the brake member in the second position when the lever is in the second position, and means overpowering the blade assembly biasing means for biasing at least one of the brake member and the operating lever toward the first position.

The invention also provides a combined brake and clutch comprising a drive member mounted for rotation and including thereon a first clutch part, a driven member carried for rotation coaxially with and relative to the drive member, a braking surface connected to the driven member for common rotation therewith and for movement relative to an extended position, a second clutch part connected to the driven member for common rotation therewith and for movement relative to a position of engagement with the first clutch part, biasing means operative simultaneously to locate the second clutch part in the position of engagement and to locate the brake surface in the extended position, and a brake member movable between a first position wherein the brake member engages the braking surface so as to brake rotation of the driven member and so as to displace the braking surface from the extended position against the action of the biasing means and simultaneously to interrupt action of the biasing means to locate the second clutch part in the position of engagement, and a second position wherein the brake member is spaced from the braking surface.

In accordance with an embodiment of the invention, there is further included means biasing the brake member to the second position.

In accordance with an embodiment of the invention, there is further included manual means for overpowering the brake member biasing means so as to displace the brake member to the first position.

In accordance with an embodiment of the invention, the blade assembly or driven member is supported for rotation from the drive shaft or member.

In accordance with an embodiment of the invention, the drive shaft or member has a shoulder, and the means biasing the blade assembly or driven member comprises a spring operable between the shoulder and the blade assembly or driven member.

In accordance with an embodiment of the invention, the drive shaft or driven member includes a downwardly open axial bore and the means biasing the blade assembly or driven member to engage the clutch means comprises a spring located in the bore and acting, at one end thereof, against the drive shaft or member, and at the other end thereof, against the blade assembly or driven member.

In accordance with an embodiment of the invention, the blade assembly or driven member includes an extending portion and the non-rotatably means for displacing the blade assembly or driven member against the action of the means biasing the blade assembly or driven member and for braking rotation of the blade assembly or driven member comprises a brake member movable axially of the drive shaft or member and engagable with the blade assembly or driven member.

In accordance with an embodiment of the invention, the driven member or blade assembly includes first and second means secured together to form a chamber including the clutch means and a quantity of lubricant. In addition, it is preferred to include bearing and sealing means located between the drive shaft or member and the chamber to seal the chamber and to afford relative rotary and axial movement between the drive shaft or member and the blade assembly or driven member.

In accordance with an embodiment of the invention, the driven member or blade assembly is mounted by means including a retaining ring which is carried by the drive shaft or member and which axially supports the clutch means and wherein the clutch means axially supports the blade housing or driven member.

One of the principal features of the invention is the provision of a rotary lawn mower including a relatively simple arrangement for rotatably engaging and disengaging a cutter blade assembly and for braking the cutter blade assembly against rotation simultaneously with disengagement.

Another of the principal features of the invention is the provision of a rotary lawn mower including a clutch which is biased into engagement by a spring engaging a cutter blade assembly and which is disengagable in response to engagement with the cutter blade assembly of a brake member which displaces the cutter blade assembly against the action of the spring to disengage the clutch and to simultaneously brake the cutter blade assembly against rotation.

Another of the principal features of the invention is the provision of a rotary lawn mower as set forth in the preceding paragraph, together with a spring biasing the brake member so as to overpower the spring which engages the clutch, and manually operative means for overpowering the brake member biasing spring.

Another of the principal features of the invention is the provision of a combination clutch and brake mechanism including a spring which biases a driven member so as to engage a clutch between the driven member and a drive member, together with a brake member which is engagable with the driven member so as to displace the driven member against the action of the spring to thereby disengage the clutch and which, simultaneously, brakes the driven member against rotation.

Other features and advantages of the embodiments of the invention will become known by reference to the following description, claims, and appended drawings.

DRAWINGS

FIG. 1 is a schematic side elevational view of a lawn mower incorporating various of the features of the invention.

FIG. 2 is an enlarged view, partially broken away and in section, of a combined clutch and brake mechanism incorporated in the lawn mower shown in FIG. 1.

Figures 3, 5:
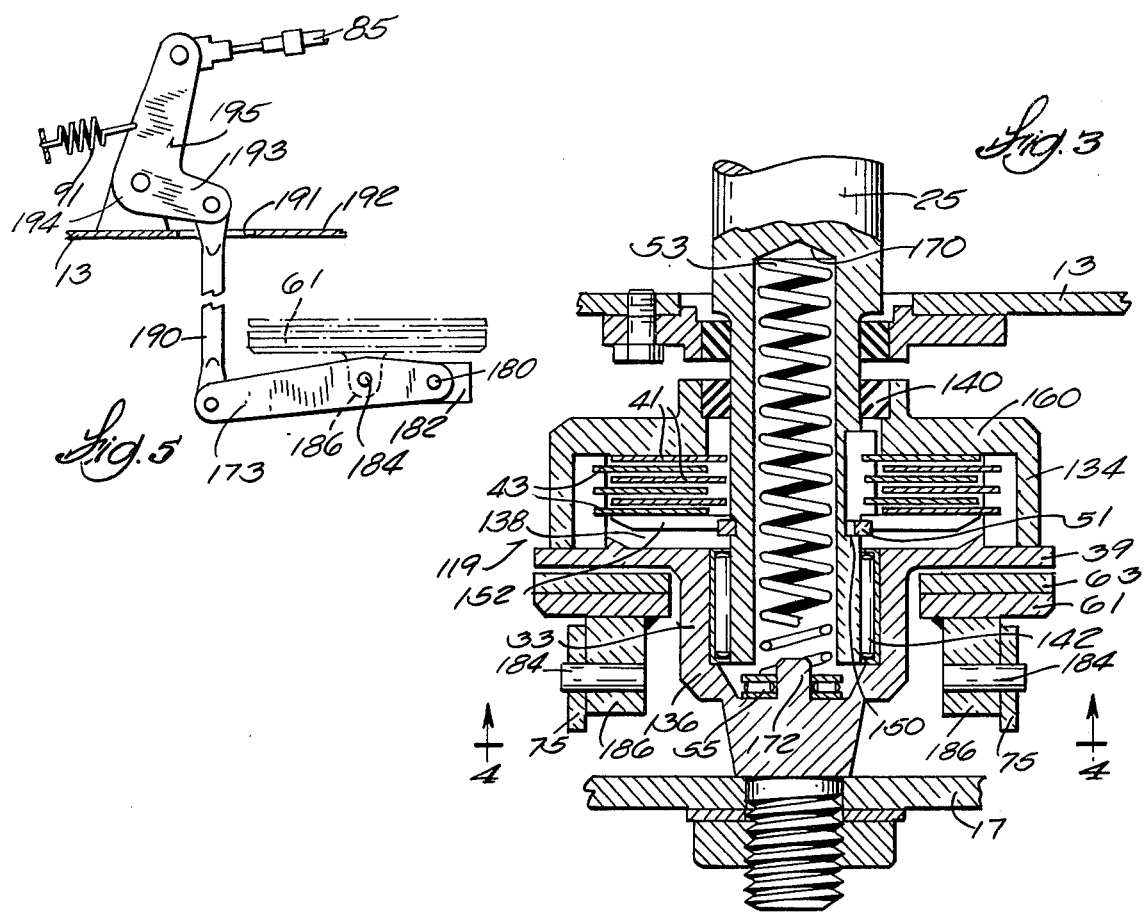
FIG. 3 is an enlarged view, partially broken away and in section, of another embodiment of a combined clutch and brake mechanism which can be incorporated in the lawn mower shown in FIG. 1.
FIG. 5 is a fragmentary view taken generally along lines 5—5 of FIG. 4.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a lawn mower 11 including a blade housing 13 supporting a prime mover 15 which drives a cutter blade 17 through a combined clutch and brake mechanism 19. The blade housing 13 can be suitably supported for travel over the ground in any manner, and can be guided for travel over the ground by a suitable handle 21 or other handle bar or steering mechanism.

More particularly, the prime mover can be either an internal combustion engine or an electric motor rotating (See FIG. 2) an output or drive shaft or drive member 25 including a lower end portion 27 extending from a shoulder 29. The cutter blade 17 forms a part of a cutter blade assembly or driven member 31 and is bolted or otherwise suitably fixedly connected to a hub or hub member 33 including a lower mounting flange 35 fixed to the cutter blade 17. The hub member 33 also includes a generally cylindrical hub portion 37 extending from the mounting flange 35 in encircling relation to the lower end portion 27 of the output shaft 25 and an upper flange 39 which extends both radially inwardly and radially outwardly from the upper end of the cylindrical hub portion 37 in generally parallel relation to the cutter blade 17.

Clutch means are provided between the output shaft or drive member 25 and the cutter blade assembly or driven member 31. In the illustrated construction, a series of friction leaves or disks 41 are keyed or splined to the lower end portion 27 of the output shaft or drive member 25 for common rotation with the output shaft 25 while also permitting movement of the leaves or disks 41 axially of the output shaft 25. Interleaved between the disks or leaves 41 is another series of disks or leaves 43 which are keyed or splined to the inner surface of the cylindrical hub portion 37 of the hub member 33 for rotation in common with the blade assembly 31 and for movement axially of the cylindrical hub portion 37 of the hub member 33. Thus, when the two series of disks 41 and 43 are pressed together into driving engagement, rotary power is transmitted from the output shaft or drive member 25 to the cutter blade assembly or driven member 31. When the leaves or disks 41 and 43 are not pressed together, the output shaft 25 and blade assembly 31 are rotatable relative to each other.

Means are provided for retaining the blade assembly 31 on the output shaft or drive member 25. In the illustrated construction, such means comprises a washer 51 which is secured to the bottom of the lower end portion 27 of the drive member 25 and which extends radially outwardly sufficiently to engage the under surface of the lowermost one of the disks 41 and 43 and thereby retain the blade assembly 31 mounted on the drive member 25.

Means are also provided for biasing the disks 41 and 43 into driving engagement with one another. While various arrangements can be employed, in the illustrated construction, such means comprises a helical spring 53 which is located in surrounding relation to the drive member 25 and which, at the upper end thereof, engages a thrust washer or bearing 55 seated against the shoulder 29 and which, at the lower end thereof, engages the top surface of the upper flange 39 of the hub member 33.

Means are provided for upwardly displacing the blade assembly 33 against the action of the spring 53 to permit relative rotation between the two series of disks 41 and 43 and to simultaneously brake the blade assembly 33 against rotation. While various arrangements can be employed, in the illustrated construction, such means comprises a brake member 61 which is located below the lower surface of the upper flange 39 of the hub member 33 in encircling relation to the hub portion 37 and which includes an upper surface having mounted thereon a brake pad 63 engagable with a braking surface constituted by the lower surface of the upper flange 39.

Means are provided on the lawn mower 11 for guiding movement of the brake member 61 in the direction of the axis of drive member rotation and for displacing the brake member 61 between a retracted position below the lower surface of the upper flange 39 and a raised position engaging the brake pad 63 against the lower surface of the upper flange 39 so as to raise the blade assembly 33 to disengage the clutch against the action of the spring 53 and simultaneously to stop or brake rotation of the blade assembly 33.

Various arrangements can be employed for guiding and displacing the brake member 61. In the illustrated construction, the blade housing 13 carries a guide surface 71 which engages the brake member 61 to guide movement thereof and to prevent rotation of the brake member 61 relative to the blade housing 13. Any suitable interlocking engagement between the brake member 61 and the guide surface 71 can be employed to prevent relative rotary movement therebetween. The means for displacing the brake member 61 can also take various forms and, in the illustrated construction, comprises a double ended lever 73 which is pivotally mounted at 74 from the blade housing 13 and which includes a fork part having two spaced legs 75 located laterally outwardly of the brake member 61. The legs 75 and the brake member 61 include interengaging connecting means, such as pin and slot connections 76 for preventing rotary movement of the brake member 61 while effecting vertical displacement of the brake member 61 between the raised and lowered positions in response to pivotal movement of the fork member 73.

The means for displacing the brake member 61 also includes an operating lever 81 which is mounted on a portion 83 of the handle 21 and which is movable between a position adjacent to the handle portion 83 and a position spaced from the handle portion 83. In addition, the means for displacing the brake member 61 includes a link or linkage 85 connecting the operating lever 81 and the lever 73 such that the lever 73 is in the position locating the brake member 61 in the lowered position when the operating lever 81 is adjacent the handle portion 83 and such that the lever 73 is positioned to locate the brake member 61 in the raised clutch disengaging and braking position when the operating lever 81 is spaced from the handle portion 83.

Means are also provided for biasing the brake member 61 toward the raised clutch disengaging and braking position. Various arrangements can be employed. In the illustrated construction, such biasing means comprises a spring 91 biasing the double ended lever 73 for movement in the clockwise direction as seen in FIG. 2.

Thus, in order to provide power transmission from the primer mover 15 to the cutter blade 17, the operating lever 81 must be held against the handle portion 83 so as to displace the brake member 61 to the lowered position permitting clutch engagement by the spring 53 and spacing the brake pad 63 from the lower surface of the upper flange 39. If the operating lever 81 is not held against the handle portion 83, the spring 91 will cause the link 85 to raise the brake member 61 to the clutch disengaging and cutter blade braking position against the action of the spring 53. Accordingly, starting of the prime mover 15 without displacing the operating lever 81 into adjacent relation to the handle portion 83 will not effect rotation of the cutter blade 17. Subsequent movement of the operating lever 81 against the action of the spring 91 by the operator to the position adjacent the handle portion 83 will cause movement of the brake member 61 to the lowered position and permit automatic clutch engagement by the spring 53 between the prime mover 15 and the cutter blade 17 to effect cutter blade rotation. When the operating lever 81 is not held in the position adjacent the handle portion 83, the brake member 61 will rise under the action of the spring 91, disengaging the clutch and stopping cutter blade rotation.

Figure 4:
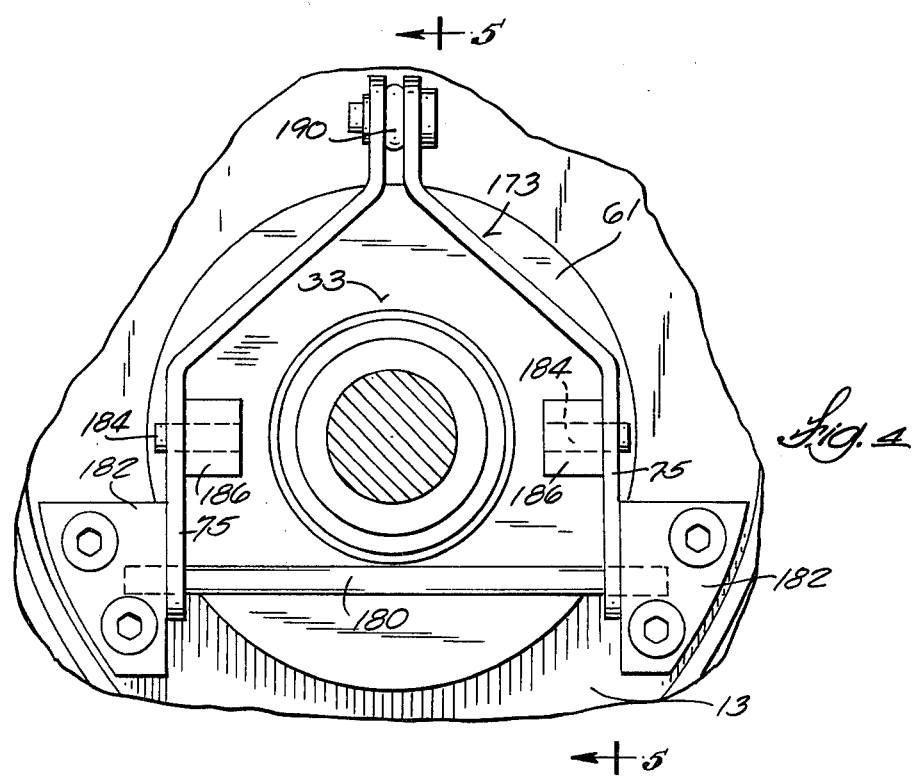
FIG. 4 is a fragmentary view taken generally along lines 4—4 of FIG. 3.

Shown in FIGS. 3 and 4 is another embodiment of a combined clutch and brake mechanism 119 which can be incorporated in the lawn mower 11 shown in FIG. 1. The combined clutch and brake mechanism 119 shown in FIGS. 3 and 4 is constructed in a manner essentially similar to the construction of the combined clutch and brake mechanism 19 shown in FIGS. 2 and 3. Accordingly the same reference numerals are applied to the components which form the combined clutch and brake mechanism 119 and which are similar to corresponding components of the combined clutch and brake mechanism 19 shown in FIGS. 2 and 3.

The combined clutch and brake mechanism 119 shown in FIGS. 3 and 4 differs from the construction shown in FIGS. 2 and 3 in that the hub 33 includes an upper, centrally apertured and downwardly open cup member 134 and a lower, upwardly open cup member 136 suitably secured together to form a chamber 138 which contains the interleaved disks 41 and 43. The chamber 138 is preferably supported for rotation on the drive shaft 25 by upper and lower bearings respectively engaged between the drive shaft 25 and the upper cup member 134 and the lower cup member 136 (only the lower bearing 142 being shown). The bearings provide for vertical movement of the hub 33 on the drive shaft 25 as well as for rotary movement therebetween. In addition a seal 140 is formed between the drive shaft 25 and the apertured upper cup member 134 to thereby seal the chamber 138.

Contained within the chamber 138 is a quantity of oil which serves to lubricate the interleaved disks 41 and 43 as well as the bearings 55 and 142 and which reduces the operating noise level.

The blade assembly 31 is retained on the drive shaft 25 for relative rotation therebetween by a retainer ring or washer 51 which is snap fitted into a groove 150 in the drive shaft 25 and which axially supports a washer type member 152 which, in turn axially supports the lower most of the interleaved disks 41 and 43. In turn, the top wall 160 of the upper cup member 134 rests on the upper most of the interleaved disks 41 and 43 so as to axially support the blade assembly 31 on the drive shaft 25.

The braking surface on the hub is constituted by the lower surface of a flange 39 at the top of the lower cup member 136.

The means biasing the blade assembly 31 downwardly so as to engage the interleaved disks 41 and 43 comprises a helical spring 53 which is located within an axial bore 170 in the drive shaft 25, which, at its upper end, bears against the blind end of the bore 170, and which, at its lower end, bears against a thrust bearing 55 surrounding a pilot pin 172 extending in an upwardly open portion of the lower cup member 136.

The means for displacing the brake member 61 axially of the drive shaft 25 comprises (See FIG. 4) a fork shaped member or lever 173 having spaced legs 75 which, at their outer ends, are pivoted to the blade housing 13 on a shaft 180 having its ends anchored in spaced blocks 182 fixed to the blade housing 13. The fork legs 75 straddle the hub 33 of the blade assembly 31 and are each pivotally connected to the brake member 61 by pins 184 extending from the legs 75 and into depending bosses 186 on the under surface of the brake member 61. Any lateral shifting of the brake member 61 which may result from pivotal movement of the fork member 173 is accommodated by clearance between the peripheral margin of the central aperture in the brake member 61 and the outer periphery of the lower cup member 136.

The fork member 173 is pivotally connected, at its other end, as shown in FIGS. 4 and 5, with one end of a link 190 which passes through an aperture 191 in the top deck 192 of the blade housing 13 and which, at its other end, is pivotally connected to one leg 193 of a bell crank lever 194 pivotally mounted on the upper surface of the top deck 192 of the blade housing 13. In turn, the other leg 195 of the bell crank lever 194 is pivotally connected to one end of the link 85 which extends to an operating lever as shown in FIGS. 1 and 2 and which operates in the same manner as the construction shown in FIGS. 1, 2, and 3.

As in the construction shown in FIGS. 2 and 3 any means can be employed to bias the overall linkage so as to normally locate the brake member 61 in its raised position braking the blade assembly 31 against rotation and effecting disengagement of the clutch. In the illustrated construction, a spring 91 is located about the pivotal mounting of the bell crank lever 194 on the blade housing 13 so as to bias the bell crank lever 194 in the counterclockwise direction as shown in FIG. 5 and so as thereby to raise the brake member 61.

The operation of the combined clutch and brake mechanism 119 shown in FIGS. 3, 4, and 5 is essentially identical to the operation of the combined clutch and brake mechanism 19 shown in FIGS. 2 and 3 and accordingly will not otherwise be explained.

Various of the features of the invention are set forth in the following claims.

What is claimed is:

1. A rotary lawn mower comprising a blade housing supported for travel over the ground, a drive shaft supported for rotation by said blade housing, a blade assembly mounted for co-axial rotation relative to said drive shaft and including a cutter blade mounted for cutting operation within said blade housing, interengagable clutch means extending from each of said drive shaft and said blade assembly, first means biasing said blade assembly to engage said clutch means, means non-rotatably mounted on said blade housing and engagable with said blade assembly for displacing said blade assembly against the action of said biasing means to permit disengaging said clutch means and for braking rotation of said blade assembly, said means for displacing said blade assembly and for braking rotation of said blade assembly comprising a brake member movable axially of said drive shaft between a first position engaging said blade assembly so as to disengage said clutch means and so as to brake blade assembly rotation and a second position spaced from said blade assembly, a handle for steering movement of said lawn mower, an operating lever mounted on said handle for movement between a first position spaced from said handle, and a second position adjacent to said handle, a linkage connecting said operating lever with said brake member to locate said brake member in said first position when said lever is in said first position and to locate said brake member in said second position when said lever is in said second position, and second means for biasing at least one of said brake member and said operating lever toward said first position so as to overpower said first biasing means.

2. A lawn mower in accordance with claim 1 wherein said blade assembly is supported for rotation from said drive shaft.

3. A lawn mower in accordance with claim 1 wherein said drive shaft has a shoulder, and wherein said biasing means comprises a spring operable between said shoulder and said blade assembly.

4. A lawn mower in accordance with claim 1 wherein said blade assembly includes an extending portion and wherein said brake member is movable axially of said drive shaft and engagable with said extending portion.

5. A lawn mower in accordance with claim 1 wherein said blade assembly also includes a lower, upwardly open cup member secured to said cutter blade and an upper, downwardly open cup member secured to said lower cup member to form a chamber including said interengagable clutch means and a quantity of lubricant.

6. A rotary lawn mower in accordance with claim 5 and further including bearing and sealing means located between said drive shaft and said chamber to seal said chamber and to afford relative rotary and axial movement between said drive shaft and said blade assembly.

7. A lawn mower in accordance with claim 5 wherein said lower cup member includes a braking surface engaged by said brake member.

8. A lawn mower in accordance with claim 1 wherein said blade assembly is mounted by means including a retaining member which is carried by said drive shaft and which axially supports said clutch means and wherein said clutch means axially supports said blade assembly.

9. A rotary lawn mower comprising a blade housing supported for travel over the ground, a drive shaft supported for rotation by said blade housing and including a downwardly open axial bore, a blade assembly mounted for co-axial rotation relative to said drive shaft and including a cutter blade mounted for cutting operation within said blade housing, interengagable clutch means extending from each of said drive shaft and said blade assembly, means biasing said blade assembly to engage said clutch means comprising a spring located in said bore and acting, at the upper end thereof, against said drive shaft and, at the lower end thereof, against said blade assembly, and means non-rotatably mounted on said blade housing and engagable with said blade assembly for displacing said blade assembly against the action of said biasing means to permit disengaging said clutch means and for braking rotation of said blade assembly.

10. A combined brake and clutch mechanism comprising a drive member mounted for rotation and including thereon a first clutch part, a driven member carried for rotation co-axially with and relative to said drive member, a braking surface on said driven member having common rotation therewith and movable relative to an extended position, a second clutch part connected to said driven member for common rotation therewith and for movement relative to a position of engagement with said first clutch part, first biasing means operative simultaneously to locate said second clutch part in said position of engagement and to locate said brake surface in said extended position, a brake member movable between a first position wherein said brake member engages said braking surface so as to brake rotation of said driven member and so as to displace said braking surface from said extended position against the action of said biasing means and simultaneously to interrupt action of said biasing means to locate said second clutch part in said position of engagement, and a second position wherein said brake member is spaced from said braking surface, and second means biasing said brake member to said first position so as to overpower said first biasing means.

11. A combined brake and clutch mechanism in accordance with claim 10 and further including means for overpowering said second biasing means so as to displace said brake member to said second position.

12. A combined clutch and brake mechanism in accordance with claim 10 wherein said driven member includes a lower upwardly open cup member and an upper, downwardly open cup member secured to said lower cup member to form a chamber including said first and second clutch parts and a quantity of lubricant.

13. A combined clutch and brake mechanism in accordance with claim 12 and further including bearing and sealing means located between said drive member and said chamber to seal said chamber and to afford relative rotary and axial movement between said drive member and said driven member.

14. A combined clutch and brake mechanism in accordance with claim 12 wherein said braking surface is located on said lower cup member.

15. A combined clutch and brake mechanism in accordance with claim 10 wherein said driven member is mounted by means including a member which is carried by said drive member and which axially supports said clutch parts and wherein said clutch parts axially support said driven member.

16. A combined brake and clutch in accordance with claim 10 wherein said driven member is supported for rotation from said drive member.

17. A combined clutch and brake mechanism comprising a drive member mounted for rotation and including thereon a first clutch part, and an axial bore, a driven member carried for rotation co-axially with and relative to said drive member, a braking surface on said driven member having common rotation therewith and movable relative to an extended position, a second clutch part connected to said driven member for common rotation therewith and for movement relative to a position of engagement with said first clutch part, biasing means operative simultaneously to locate said second clutch part in said position of engagement and to locate said brake surface in said extended position, said biasing means comprising a spring located in said bore and acting at one end thereof against said drive member and, at the other end thereof, against said driven member, and a brake member movable between a first position wherein said brake member engages said braking surface so as to brake rotation of said driven member and so as to displace said braking surface from said extended position against the action of said biasing means and simultaneously to interrupt action of said biasing means to locate said second clutch part in said position of engagement, and a second position wherein said brake member is spaced from said braking surface.

18. A combined brake and clutch comprising a drive member, a driven member mounted for co-axial rotation relative to said drive member, interengagable clutch means extending from each of said drive member and said driven member, first means biasing said driven member to engage said clutch means, non-rotatably mounted means engagable with said driven member for displacing said driven member against the action of said biasing means to disengage said clutch means and for braking rotation of said driven member, second means biasing said non-rotatably mounted means into engagement with said driven member so as to overpower said first means biasing said driven member, and manually operable means for overpowering said means biasing said non-rotatably mounted means.

19. A combined brake and clutch in accordance with claim 18 wherein said drive member has a shoulder, and wherein said first biasing means comprises a spring operable between said shoulder and said driven member.

20. A combined brake and clutch in accordance with claim 18 wherein said driven member includes an extending portion and wherein said non-rotatable means for displacing said driven member against the action of said means biasing said driven member and for braking rotation of said driven member comprises a brake member movable axially of said drive member and engagable with said extending portion.

21. A rotary lawn mower comprising a blade housing supported for travel over the ground, a drive shaft supported for rotation by said blade housing and including thereon a first clutch part, a blade assembly mounted for rotation co-axially with and relative to said drive shaft and including a cutter blade mounted for cutting operation within said blade housing, said cutter blade assembly also including a braking surface movable in common with said blade assembly relative to an extended position, said cutter blade assembly also including a second clutch part rotatable in common with said blade assembly and movable relative to a position of engagement with said first clutch part, first biasing means operative simultaneously to locate said second clutch part in said position of engagement and to locate said brake surface in said extended position, a brake member movable between a first position wherein said brake member engages said braking surface so as to brake rotation of said blade assembly and so as to displace said braking surface from said extended position against the action of said biasing means and simultaneously to interrupt action of said biasing means to locate said second clutch part in said position of engagement, and a second position wherein said brake member is spaced from said braking surface, and second means biasing said brake member to said first position so as to overpower said first biasing means.

22. A rotary lawn mower in accordance with claim 21 and further including manual means for overpowering said second biasing means so as to displace said brake member to said second position.

* * * * *